US005632937A

United States Patent [19]

Soofi et al.

[11] Patent Number: 5,632,937

[45] Date of Patent: May 27, 1997

[54] METHOD OF INSTALLING A REFRACTORY LINING

[75] Inventors: Madjid Soofi, St. Charles, Ill.; James S. Irwin, Hinckley, Ohio; Charles W. Connors, Jr., Bloomingdale, Ill.

[73] Assignee: Magneco/Metrel, Inc., Addison, Ill.

[21] Appl. No.: 446,436

[22] Filed: May 22, 1995

Related U.S. Application Data

[63] Continuation-in-part of Ser. No. 173,655, Dec. 27, 1993, abandoned, which is a continuation of Ser. No. 116,027, Sep. 2, 1993, abandoned, which is a continuation-in-part of Ser. No. 893,377, Jun. 4, 1992, abandoned, which is a continuation of Ser. No. 673,954, Mar. 22, 1991, abandoned.

[51] Int. Cl.[6] .............................. B32B 35/00; F27D 1/16

[52] U.S. Cl. .............................. 264/30; 264/36; 264/219; 264/269; 264/314; 264/317; 264/DIG. 44

[58] Field of Search .............................. 264/30, 219, 317, 264/269, 36, 314, DIG. 44

[56] References Cited

U.S. PATENT DOCUMENTS

| | | | |
|---|---|---|---|
| 1,552,064 | 9/1925 | Lake | 249/62 |
| 1,643,425 | 9/1927 | Summey | 264/317 |
| 1,656,312 | 1/1928 | Black | 264/317 |
| 1,678,976 | 7/1928 | Durfee | 249/62 |
| 1,710,931 | 4/1929 | Klein | 249/62 |
| 2,301,101 | 11/1942 | Welshans | 249/62 |
| 3,033,389 | 5/1962 | Abarotin et al. | 264/269 |
| 3,396,961 | 8/1968 | Farrington | 264/30 |
| 3,492,383 | 1/1970 | Heimgartner | 264/30 |
| 3,587,198 | 6/1971 | Hensel | 264/269 |
| 3,593,970 | 7/1971 | Seebald | 264/30 |
| 3,672,649 | 6/1972 | Allen | 264/30 |
| 3,703,348 | 11/1972 | Pivar | 425/435 |
| 3,743,187 | 7/1973 | Breunsbach | 239/489 |
| 3,836,612 | 9/1974 | Mann | 264/269 |
| 3,872,912 | 3/1975 | Axmann | 264/30 |
| 3,885,016 | 5/1975 | Pivar | 264/270 |
| 3,916,047 | 10/1975 | Niesen | 264/30 |
| 4,078,292 | 3/1978 | Porter | 264/36 |
| 4,279,844 | 7/1981 | Danjyo et al. | 264/30 |
| 4,341,514 | 7/1982 | Shanks | 432/3 |
| 4,364,798 | 12/1982 | Costa | 264/35 |
| 4,438,906 | 3/1984 | English | 264/30 |
| 4,442,050 | 4/1984 | Takuo | 264/30 |
| 4,469,309 | 9/1984 | Takashima et al. | 264/30 |
| 4,480,820 | 11/1984 | Zhukov et al. | 266/281 |
| 4,671,840 | 6/1987 | Renaud | 264/269 |
| 5,482,248 | 1/1996 | Connors, Jr. | 264/30 |
| 5,505,893 | 4/1996 | Connors, Jr. | 264/30 |

FOREIGN PATENT DOCUMENTS

| | | | |
|---|---|---|---|
| 116722 | 3/1943 | Australia | 264/317 |
| 0009021 | 3/1980 | European Pat. Off. . | |
| 0064863 | 11/1982 | European Pat. Off. | C21C 5/44 |
| 0505141 | 9/1992 | European Pat. Off. | B22D 41/02 |
| 0557838A1 | 9/1993 | European Pat. Off. | 264/36 |
| 85795 | 12/1995 | France . | |
| 281207 | 12/1914 | Germany . | |

(List continued on next page.)

OTHER PUBLICATIONS

"Stay Form" Spec–Data Sheet by Alabama Metal Industries, Corp. (Feb., 1989).

"Patent Abstracts Of Japan", vol. 12, No. 416 (M–759), published Nov. 4, 1988, regarding JP–A–63–154,258 (Kawasaki Refractories Co.) published Jun. 27, 1988.

*Primary Examiner*—Jeffery R. Thurlow

*Attorney, Agent, or Firm*—Brinks, Hofer, Gilson & Lione

[57] ABSTRACT

A method is provided for installing a refractory lining in a metallurgical vessel having a main opening which is much smaller than the diameter of the vessel. The method is especially useful in a vessel having a circular or otherwise curved cross-section. A form or mold is assembled inside the vessel, leaving a space between the form and the outer shell of the vessel. The form is supported on both sides, to maintain the distance between the form and the outer shell, and to prevent collapse or implosion of the form. Then, a pumpable casting composition having a smooth and easy flow is injected between the form and the shell, and allowed to harden. The use of the pumpable composition significantly shortens the time required to form the liner.

24 Claims, 7 Drawing Sheets

FOREIGN PATENT DOCUMENTS

| | | | |
|---|---|---|---|
| 2435532 | 2/1976 | Germany | 264/30 |
| 2512841 | 9/1976 | Germany | 264/30 |
| 2659205 | 7/1977 | Germany | C04B 35/68 |
| 4403271 | 1/1995 | Germany . | |
| 44-9646 | 5/1969 | Japan | 264/36 |
| 53-113808 | 10/1978 | Japan | 264/317 |
| 57-72758 | 5/1982 | Japan | 266/281 |
| 59-156969 | 9/1984 | Japan | 264/30 |
| 60-096580 | 5/1985 | Japan | 264/30 |
| 60-137865 | 7/1985 | Japan | 264/30 |
| 3-102190 | 4/1991 | Japan . | |
| 6-330131 | 11/1994 | Japan . | |
| 6-347177 | 12/1994 | Japan . | |
| 969453 | 10/1982 | U.S.S.R. | 264/30 |
| 1415431 | 11/1975 | United Kingdom | C04B 35/10 |
| 1513210 | 6/1978 | United Kingdom | C04B 35/14 |
| 2105828 | 3/1983 | United Kingdom | F27D 1/16 |
| 85/02397 | 6/1985 | WIPO | 264/30 |

METHOD OF INSTALLING A REFRACTORY LINING

RELATED APPLICATIONS

This application is a continuation-in-part of U.S. application Ser. No. 08/173,655, filed on Dec. 27, 1993, now abandoned which in turn is a continuation of U.S. application Ser. No. 08/116,027, filed on Sep. 2, 1993, now abandoned which in turn is which in turn is a continuation-in-part of U.S. application Ser. No. 07/893,377, filed on Jun. 4, 1992, now abandoned which in turn is a continuation of U.S. application Ser. No. 07/673,954, filed on Mar. 22, 1991, now abandoned.

FIELD OF THE INVENTION

This invention relates to a method of installing a refractory lining in a torpedo vessel or other metallurgical vessel having an opening which is too small for insertion of a preformed mold.

BACKGROUND OF THE INVENTION

The use of a preformed mold or "form" for installing a refractory lining adjacent to a brick surface, for example, in a chimney, duct, or furnace, is described in U.S. Pat. No. 4,442,050, issued to Takuo. Initially, the work surface to be lined is surrounded by a screening member, such as a wire netting having suitable air escape openings. The screening member or "form" is positioned relative to the work surface so that the work surface and screening member define a space to be occupied by the refractory lining. Then, refractory material is poured or sprayed into the space, and caused to harden.

The foregoing prior art method uses a preformed screen mold large enough to cover the work surface being lined. This method is adequate for chimneys, ducts, and other containment devices which have large enough openings to accommodate insertion of a preformed mold having suitable dimensions. However, this prior art method has not been suitable for any vessel or other containment device whose main opening is too small to allow insertion of a preformed mold, i.e., whose main opening is much smaller than the diameter of the containment device. In these situations, the refractory liner has usually been formed by the tedious and time consuming installation of refractory bricks.

U.S. Pat. No. 3,672,649, issued to Allen, discloses the use of stacked segments of a consumable mold in a blast furnace. Each segment includes a circular form supported by a plurality of radially adjustable spokes. The radially adjustable spokes facilitate the initial insertion of the form segments into the blast furnace opening, whose diameter is only slightly smaller than the widest diameter desired for a mold segment during use. However, since the amount of radial adjustment is limited by mechanical features of the device, the disclosed method would not be useful in a torpedo vessel or other metallurgical vessel whose main opening is much smaller than both the diameter of the vessel and the maximum diameter required for the consumable form during use. Also, this reference discloses the use of a labor-intensive gunning process for injecting refractory composition into the mold.

SUMMARY OF THE INVENTION

The present invention is a method for installing a refractory liner which is particularly suitable for the inner surfaces of a containment device whose main opening is much too small to allow insertion of a preformed mold. Examples of such containment equipment, used in the iron and steel industry, include, but are not limited to, torpedo ladles, waste incinerators, and rotary kilns. The invention is particularly suitable for installing refractory linings in torpedo ladles used to transfer iron from a blast furnace to a basic oxygen furnace.

In accordance with the invention, a mold is completely assembled in situ and installed at a spaced location from the inner wall or work surface of the ladle, furnace or other containment device. By "in situ" it is meant that the mold is assembled inside the metallurgical vessel by persons working in the vessel. The use of preformed mold segments having diameters as wide, or nearly as wide, as the assembled form during use, would be excluded from this definition of in situ. The mold must be initially disassembled so that the required materials can be inserted through an opening much smaller than the assembled diameter of the mold.

The mold can include a consumable form, made of lightweight screen, fabric or other material which burns and disintegrates after use. Alternatively, the form can be made of reusable segments of steel plate, heavy duty screen or other material which can be disassembled and removed after use. For purposes of convenience, a consumable form is preferred.

A plurality of spacers, or another suitable "outer" support mechanism, can be installed between the form and the work surface, to maintain the distance between the form and the work surface. A plurality of steel rings of adjustable perimeter length and shape, or another hollow "inner" support mechanism, can be installed adjacent to the form on the side opposite the work surface, to prevent implosion or collapse of the form during use. The term "hollow" inner support mechanism refers to any support mechanism which does not require spokes or other inner mechanical structure to provide the support. Hollow support mechanisms are easier to install through a relatively small vessel opening due to their simple structure. Also, hollow support mechanisms allow workmen to move freely in the vessel.

Next, a pumpable, free flowing refractory casting composition is injected into the space between the form and the work surface, until the space has been suitably filled, to form the liner. The refractory composition is pumpable in order to facilitate easy transport, and sufficiently free flowing to reach the areas of the mold remote from the relatively small main opening. The refractory composition is caused to set up or harden, to form a liner. Then, the inner support mechanism can be removed, followed by the form, if reusable. The refractory liner can then be baked.

With the foregoing in mind, it is a feature and advantage of the invention to provide a method of installing a refractory liner in molten metal containment devices whose main opening is much too small to permit insertion of a preformed mold.

It is also a feature and advantage of the invention to provide a method of installing a refractory liner in molten metal containment devices such as torpedo vessels which is relatively fast, easy and cost efficient.

It is also a feature and advantage of the invention to provide a method of installing a refractory liner in a molten metal containment vessel which has a large number of sides, or which has a circular or otherwise curved cross-section.

The foregoing and other features and advantages of the invention will become further apparent from the following detailed description of the presently preferred embodiments, when read in conjunction with the accompanying drawings. The detailed description and drawings are merely illustrative rather than limiting, the scope of the invention being defined by the appended claims and equivalents thereof.

DETAILED DESCRIPTION OF THE PRESENTLY PREFERRED EMBODIMENTS

Figure 1:
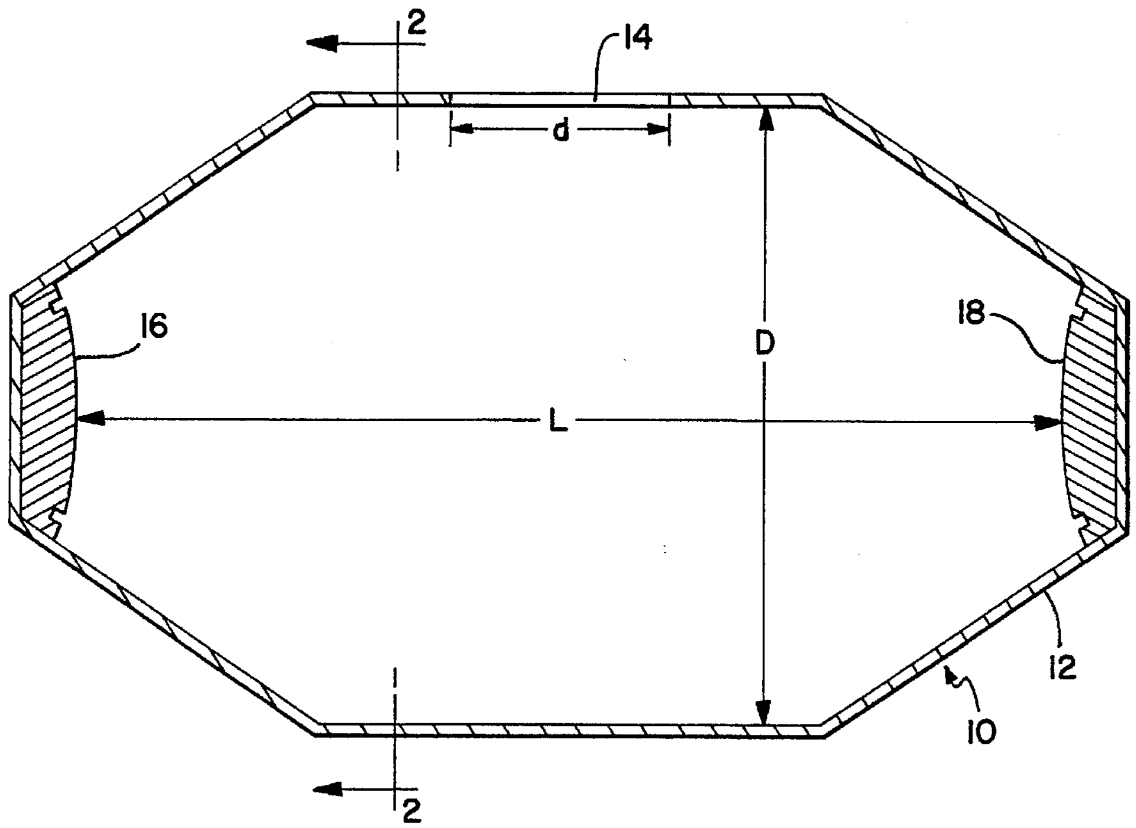
FIG. 1 is a side sectional view of the outer steel shell of a standard torpedo vessel, prior to installing a refractory lining. The top opening is small relative to the diameter of the vessel.
Figure 2:
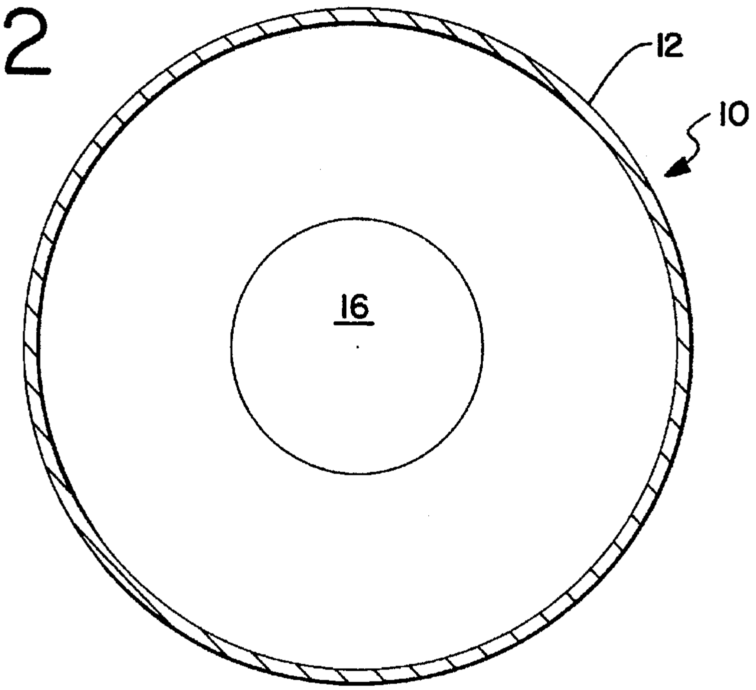
FIG. 2 is a front sectional view, taken along line 2—2 in FIG. 1.

Referring to FIGS. 1 and 2, a shell 12 of a torpedo vessel 10 has a hexagonal cross-section when viewed from the side (FIG. 1) and a circular cross-section when viewed from the front (FIG. 2). The shell 12 has a top main opening 14 which may be circular. The top opening 14 has a diameter "d" which is much smaller than a diameter "D" of the inside of the vessel 10, and is also much smaller than the length "L" of the vessel. Because the diameter "d" of the main opening 14 is much smaller than a corresponding diameter "D" of the inside of the vessel 12, it is not possible to install a preassembled mold, and the method of the invention becomes especially useful. In addition to torpedo vessels, the method of the invention is also advantageous in other metallurgical vessels whose main opening has a diameter less than half, or even less than two thirds, of the internal diameter of the vessel being lined. The method of the invention is very useful in vessels having circular or otherwise curved cross-sections.

The shell 12 is formed of steel. Two end caps 16 and 18, formed of a high temperature resistant refractory material, are located at opposite ends of the shell 12, and can be mounted in place using studs welded to the shell 12 (not shown) and passing into the end caps 16 and 18. Other means of supporting the end caps 16 and 18 can also be employed.

Preferably, the end caps are formed from a high alumina refractory casting composition. Examples of suitable casting compositions are described in U.S. Pat. No. 5,147,830, the disclosure of which is incorporated herein by reference. The end caps 16 and 18 help support the form, as hereinafter discussed, and ultimately become part of the refractory lining.

Figure 3:
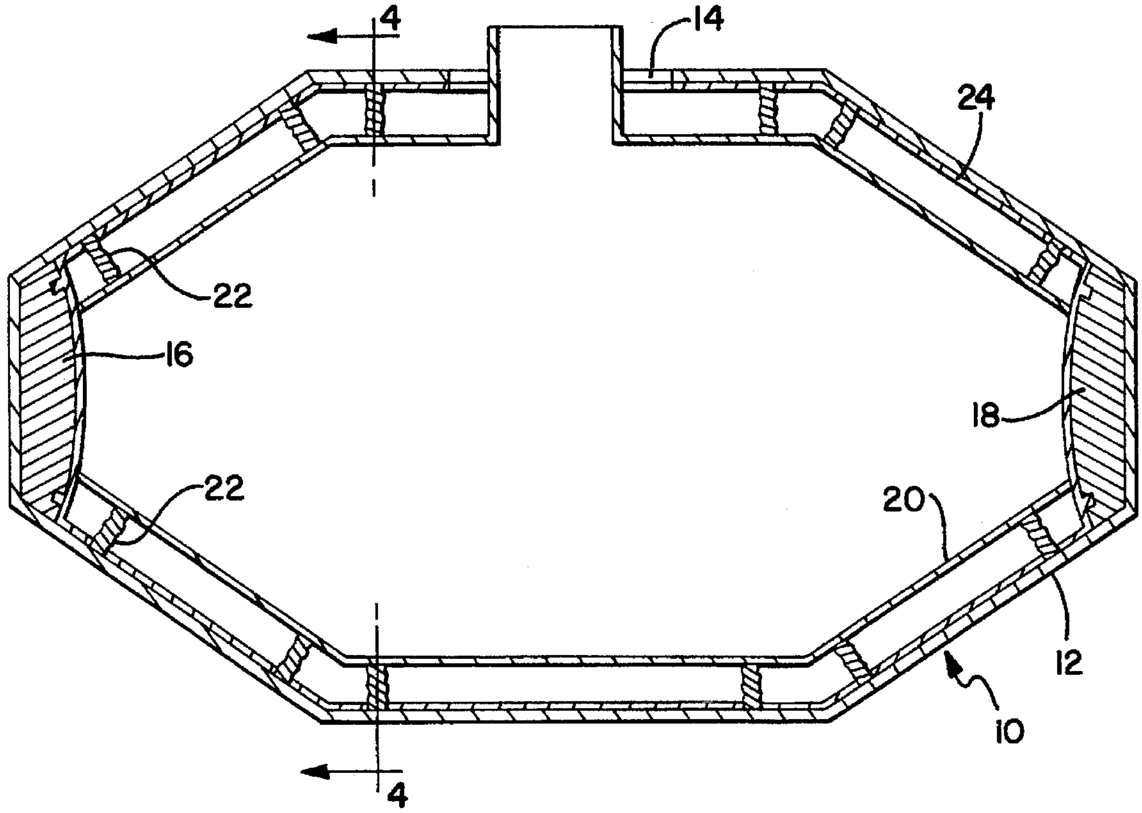
FIG. 3 illustrates the torpedo vessel of FIG. 1 after a plurality of spacers (outer support mechanism) and a form have been installed.
Figure 4:
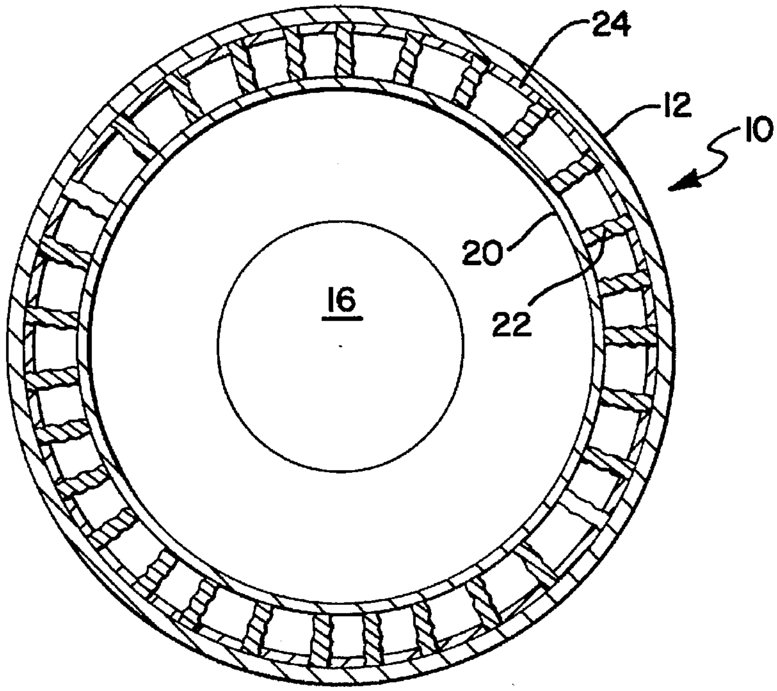
FIG. 4 is a front sectional view, taken along line 4—4 in FIG. 3.

FIGS. 3 and 4 illustrate the first steps of assembling a form or mold in situ inside the torpedo vessel 10. These steps include installing an outer support mechanism for the form and assembling the form in place, piece by piece. The outer support mechanism can be any mechanism which maintains a suitable distance (equal to the thickness of the refractory lining being constructed) between the outer shell 12 and the form 20 shown in FIGS. 3 and 4.

A particularly suitable outer support mechanism includes a plurality of refractory support anchors 22, each having a height equal to the thickness of the refractory lining being formed. The refractory support anchors 22 are positioned at spaced locations across the entire inner surface of the steel shell 12 which is to be lined. The support anchors 22 are mounted perpendicular to the steel shell 12 using any suitable mounting technique. The refractory anchors can, for instance, be held into place by metal clips known in the art as "C-clips" which are welded at spaced locations on the inner surface of steel shell 12.

One such mounting technique involves "gunning" the support anchors 22 or their mounts (e.g. C-clips) into place by applying a layer 24 of gunning material across the entire inner surface of the steel shell 12, to a thickness sufficient to surround the lowermost portions or "feet" of the anchors 22, thereby holding the anchors 22 in place. A particularly suitable gunning material is an alumina-based material sold under the trade name "Metgun 28", available from Magneco/Metrel, Inc., of Addison, Ill. When this technique is employed, both the gunning layer 24 and the refractory anchors 22 ultimately form part of the refractory lining being constructed. Alternatively, the support layer 24 in the lower half of the vessel may be formed using molten plastic which hardens, thereby reducing the amount of gunning required. As another alternative, thin layer of refractory insulating boards (not shown) may be installed to line the steel shell, and the support layer 24 may then be formed over the refractory insulating boards.

The form 20 can be a consumable form constructed, for example, from a wire mesh screen or wood planks that burn during use of the vessel, or from a refractory material that becomes part of the refractory lining once installed. The form 20 can also be a non-consumable (i.e. reusable) form constructed, for example, from steel plate segments that can be removed after the refractory lining is installed. The form must initially be in segments which are small enough to fit through the main opening 14 of the vessel 12. Once inside the vessel 10, the form segments can be joined together in any suitable manner.

Figure 5:
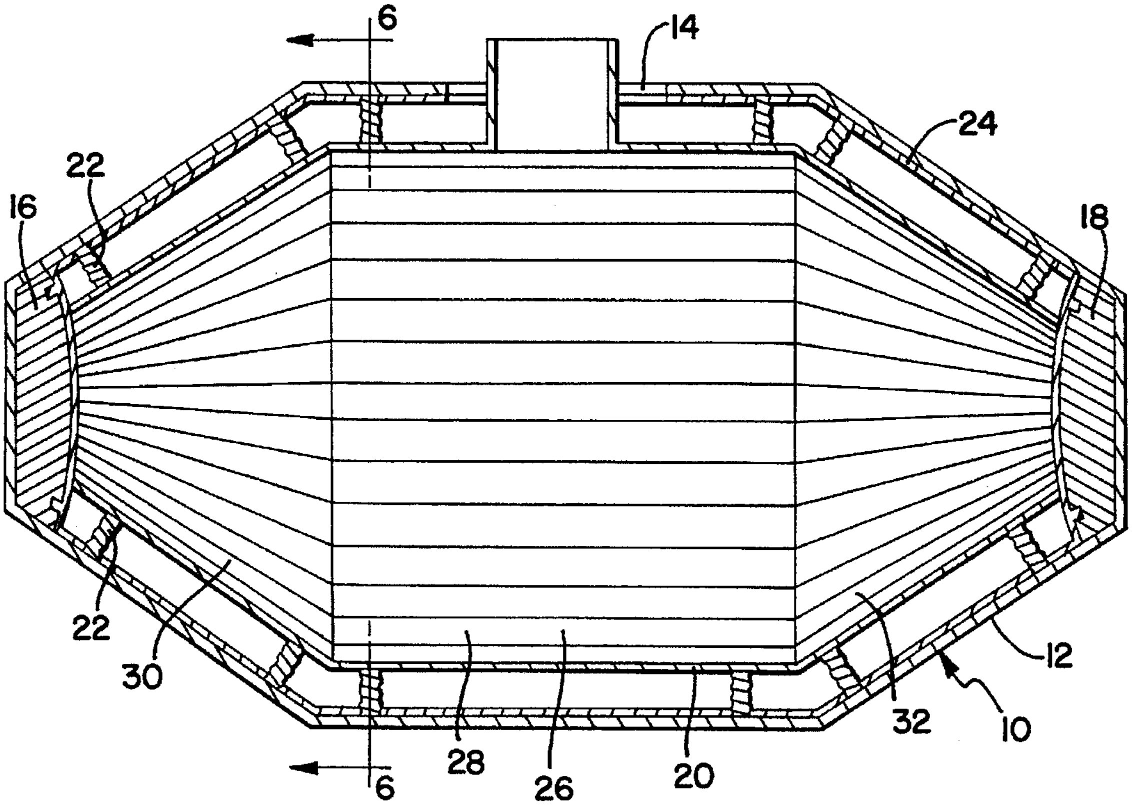
FIG. 5 illustrates one embodiment of the lined torpedo vessel which the form is constructed from a plurality of refractory boards.
Figure 6:
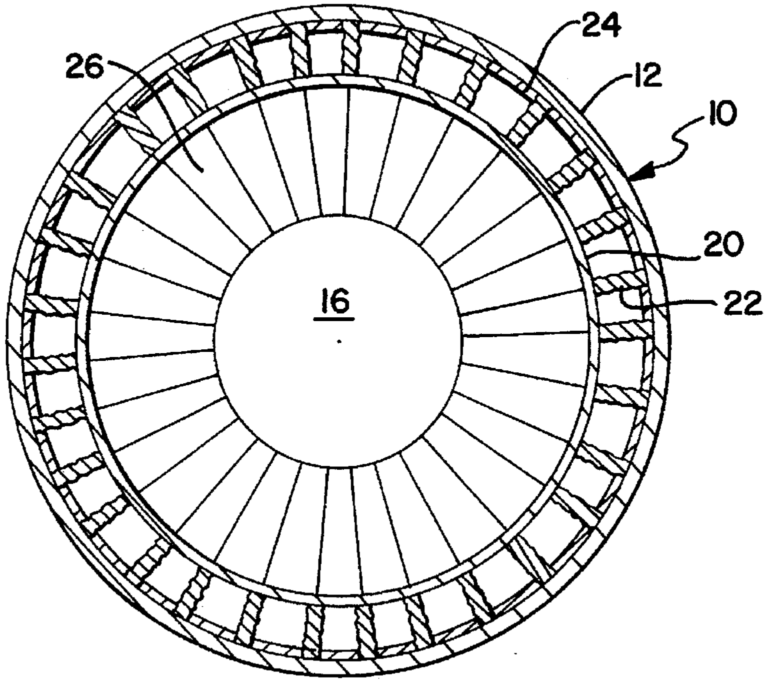
FIG. 6 is a front sectional view, taken along lines 6—6 in FIG. 5.

One embodiment of the form 20 involves the installation of wood boards 26 illustrated in FIGS. 5 and 6. The boards 26 can be configured as shown, or in any other fashion which defines a complete form. The boards 26 can be fastened into place at the end caps 16 and 18, and can be joined end to end and/or side by side, and to the anchors 22, using a variety of techniques familiar to persons skilled in the art. The wood boards 26, which can have thicknesses of about two inches, are assembled into a consumable form which burns during use of the torpedo vessel 10 after the refractory lining has been installed. The boards 26 can be assembled in three circumferential rows 28, 30 and 32, as shown.

Figure 13:
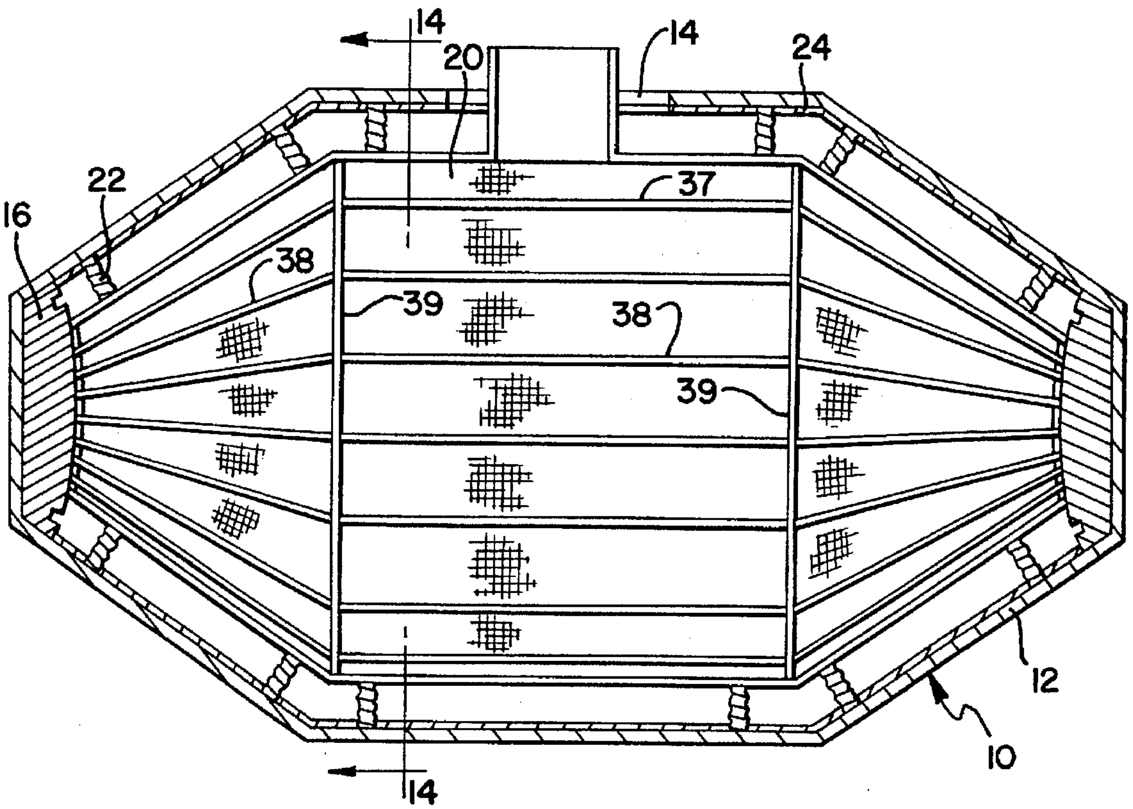
FIGS. 13 and 14 correspond to FIGS. 6 and 7 except that a wire mesh screen is used as the form (instead of refractory boards) and the form is supported by a hollow metal frame assembled in situ in the vessel.
Figure 14:
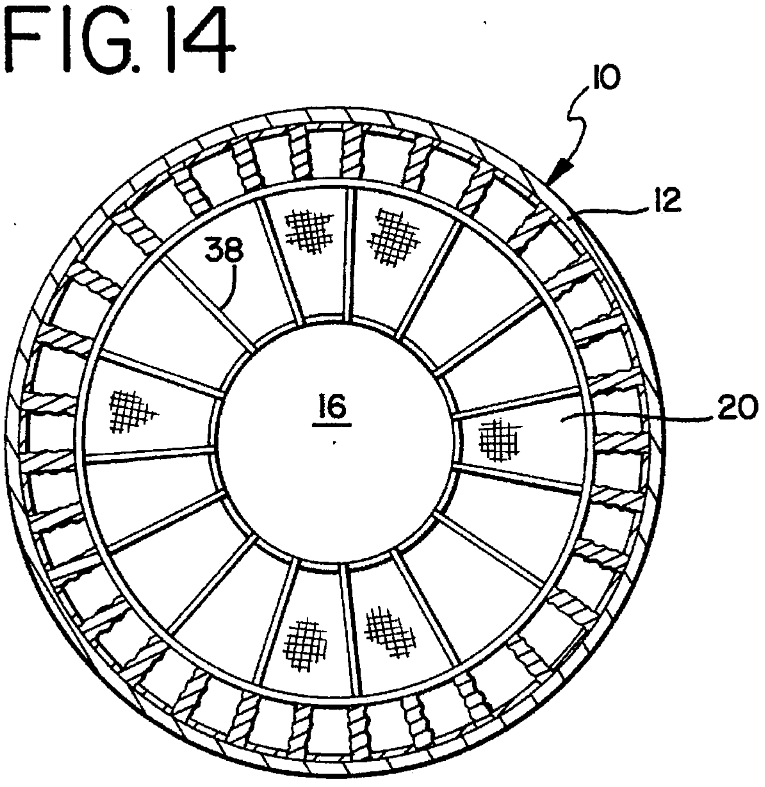

Another embodiment of the form involves the use of a porous screen instead of the wood boards 26. A suitable wire mesh screen is sold under the trade name STAFORM®. The screen can be mounted to the ends of the anchors 22, and can be supported using a hollow metallic frame installed in situ in the metallurgical vessel. Referring to FIGS. 13 and 14, the form 20 can be constructed in situ of any consumable wire mesh screen made of aluminum, steel, other metals, polymer, or fabric. The form is supported internally by metal frame 37 constructed from lateral beams 38 and circumferential beams 39 which intersect and are connected to each other by welding, nuts and bolts, or other fasteners. The use of a porous screen facilitates drying and hardening of the refractory composition.

Figure 7:
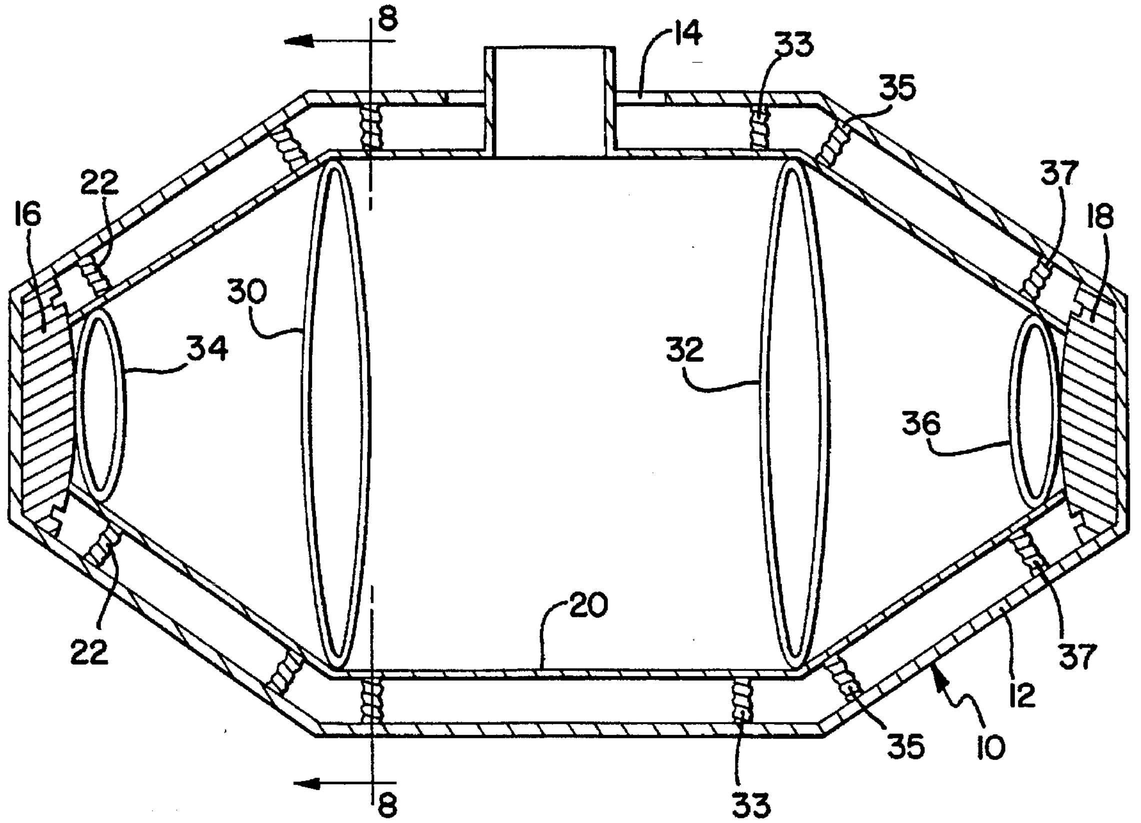
FIG. 7 illustrates the torpedo vessel of FIG. 3 after a plurality of adjustable length steel rings (internal support mechanism) have been installed. The steel rings are shown in slight perspective, to provide a clearer illustration.
Figure 8:
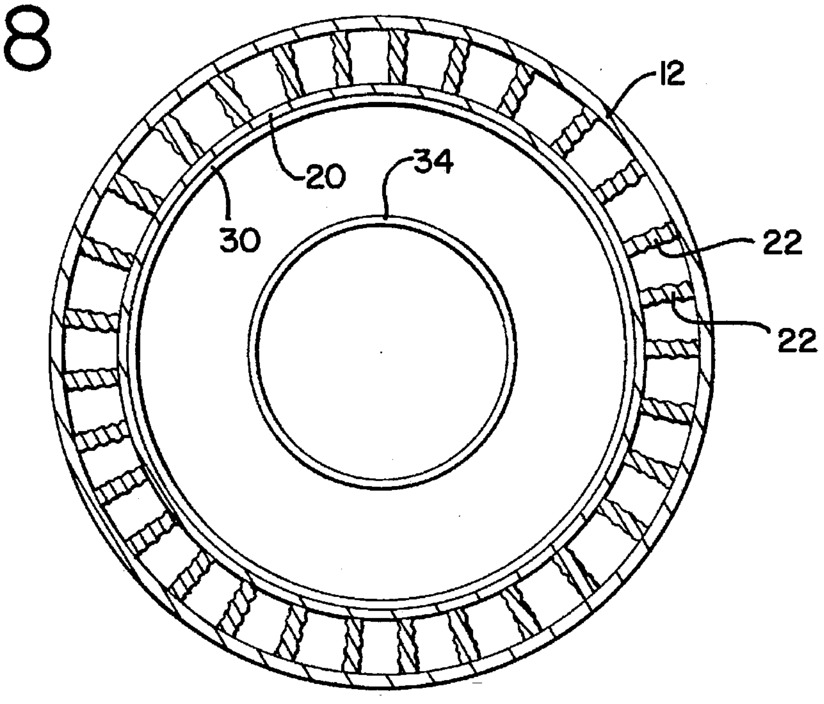
FIG. 8 is a front sectional view, taken along line 8—8 in FIG. 7.

Regardless of how the form 20 and outer support mechanism are assembled, a hollow inner support mechanism should be installed in order to prevent the form 20 from collapsing or imploding during and after installation of the refractory lining material and before the lining material hardens and sets. By "hollow" it is meant that the inner support mechanism need not include radial spokes or other internal workings that would obstruct movement of a worker in the vessel. Referring to FIGS. 7 and 8, a plurality of properly sized steel rings having adjustable circumferences are particularly useful for this purpose. The adjustable steel rings 30, 32, 34 and 36 are shown in slight perspective in FIG. 7 to facilitate clarity, while the remaining elements in the torpedo vessel 10 are shown in section. The steel rings can be inserted into the vessel as strands whose ends are then joined to form rings.

Two of the steel rings 30 and 32 are mounted perpendicular to the widest portion of the vessel 10 (FIG. 7) and are tightened so as to provide firm and uniform support around the wide circumference of the form 20 (FIG. 8). Preferably, the rings 30 and 32 are each positioned and "anchored" between two adjacent rows of refractory spacers 22. For instance, as shown in FIG. 7, the adjustable steel ring 32 is positioned between two circumferential rows 33 and 35 of anchors 22.

Two of the steel rings 34 and 36 are mounted perpendicular to the narrowest portions of the vessel 10 (FIG. 7) and are tightened so as to provide firm and uniform support around the narrow circumferences of the form 20 (FIG. 8). Preferably, the rings 34 and 36 are positioned adjacent to the end plates 16 and 18 and are "anchored" between the end plates and corresponding adjacent rows of refractory anchors 22. For instance, as shown in FIG. 7, the adjustable steel ring 36 is positioned between the end plate 18 and the circumferential row 37 of spacers 22.

In FIGS. 13 and 14, the metal frame 37 constructed of lateral beams 38 and circumferential beams 39 can be made from aluminum, steel, another metal, or another rigid material capable of supporting the form 20 as it is being loaded with refractory liner material. The support frame 37 can, itself, be consumable or removable after use. The beams 38 and 39 intersect and are fastened together to form a hollow support lattice, without the need for radially projecting spokes or similar inner workings.

Figure 9:
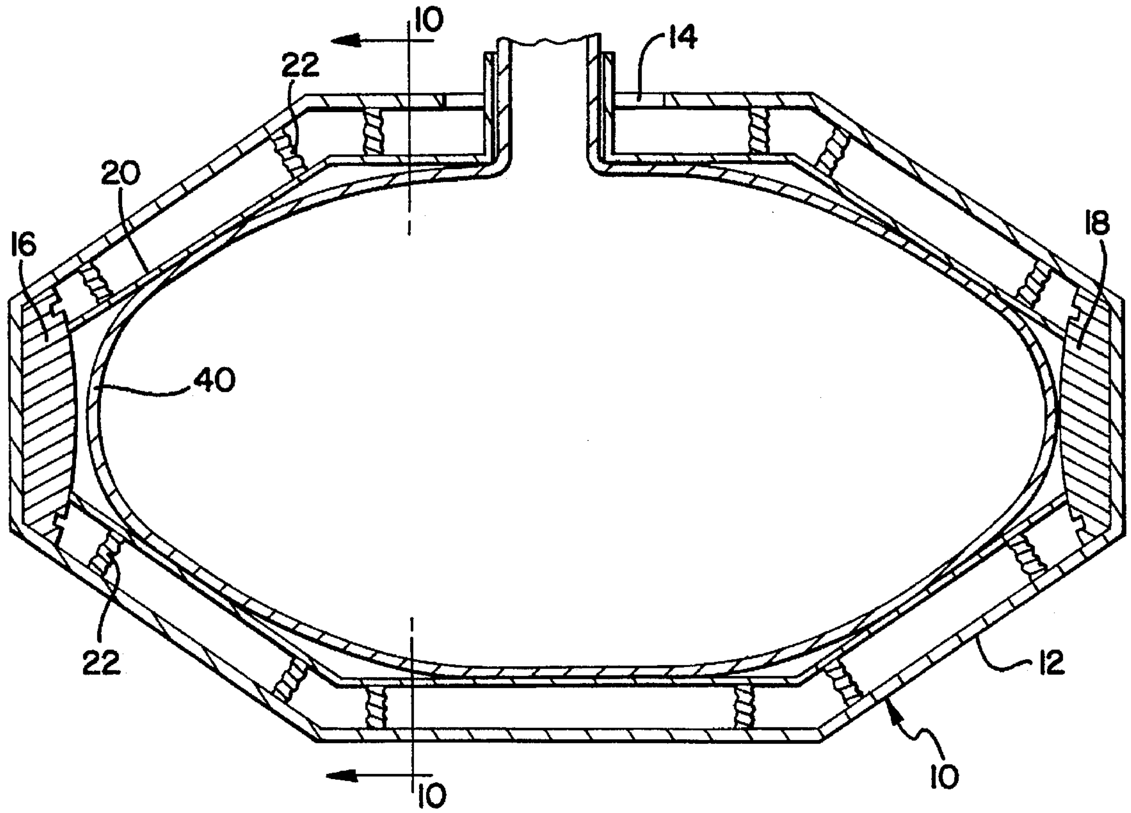
FIG. 9 illustrates the torpedo vessel of FIG. 3 after an inflatable air bag (alternative internal support mechanism) has been installed.
Figure 10:
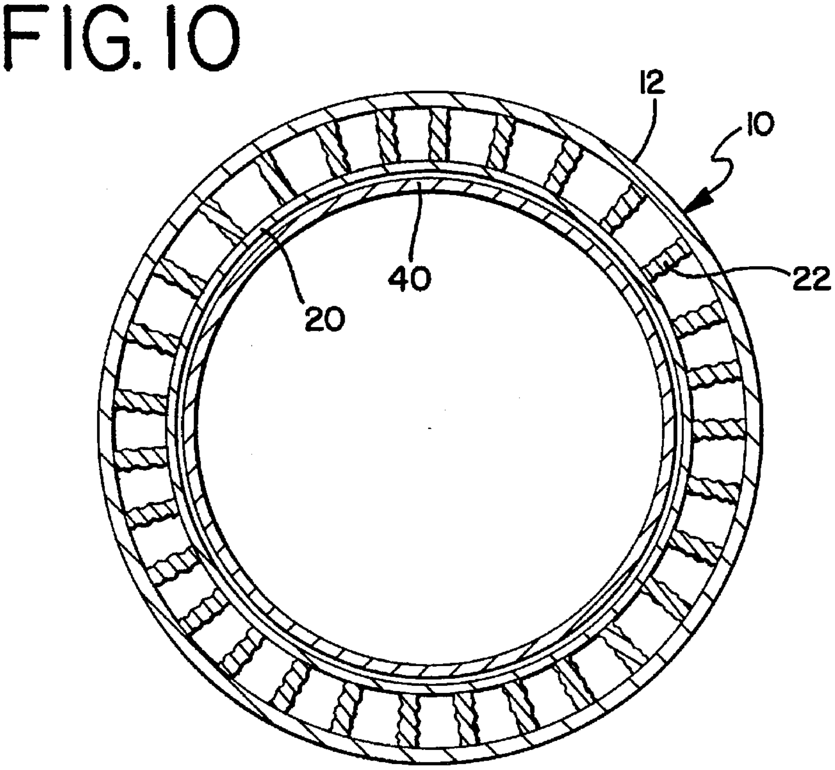
FIG. 10 is a front sectional view, taken along line 10—10 in FIG. 9.

Other embodiments of a hollow internal support mechanism may alternatively be employed. As shown in FIGS. 9 and 10, a large flexible bag 40 can be inserted into the interior of the torpedo vessel 10 whereupon the bag 40 can be inflated with air to any desired pressure. As the bag 40 is inflated, the pressure exerted by the bag against the interior surface of the form 20 increases, and the surface are of the form 20 in direct contact with the bag 40 increases. The bag 40 can be made from flexible plastic, rubber, or another suitable material.

Figure 11:
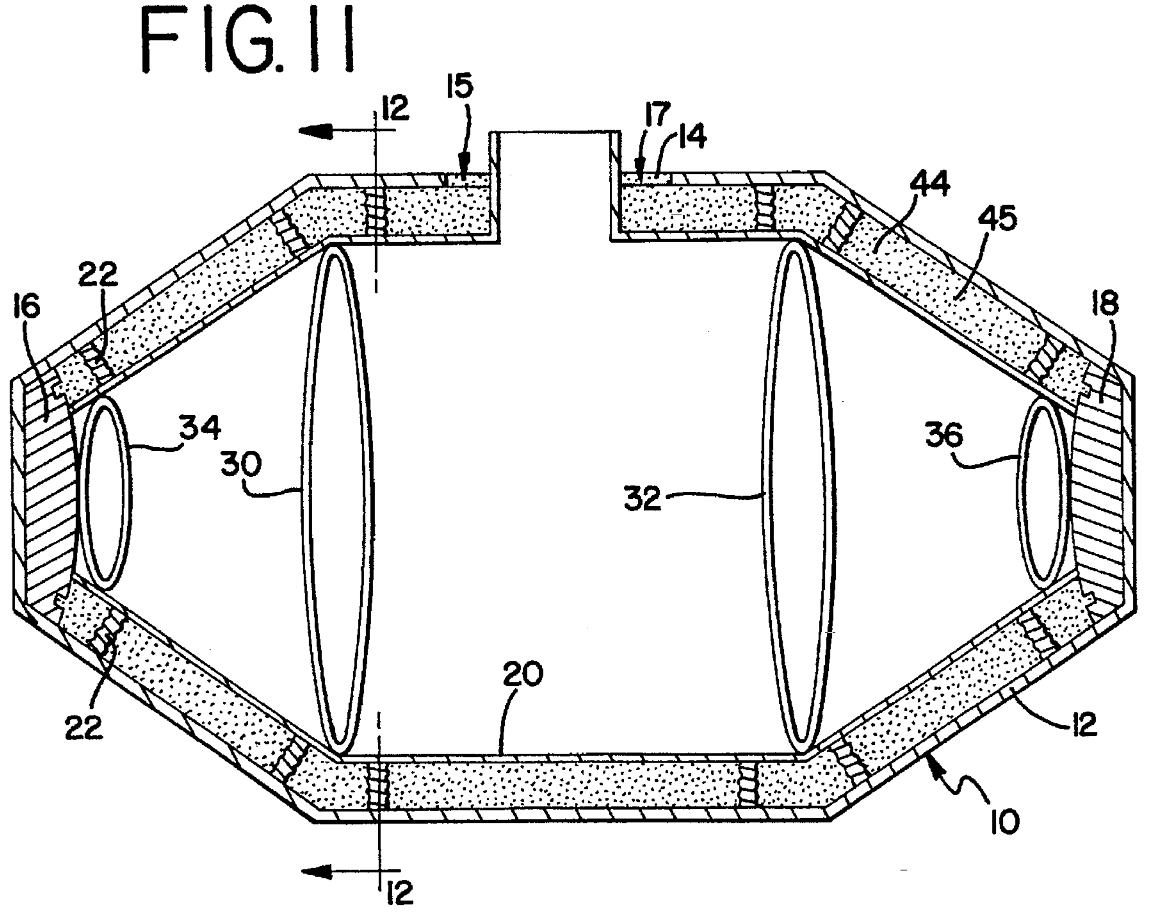
FIG. 11 illustrates the torpedo vessel of FIG. 7 after a refractory lining material has been pumped into the space between the form and the outer steel shell.
Figure 12:
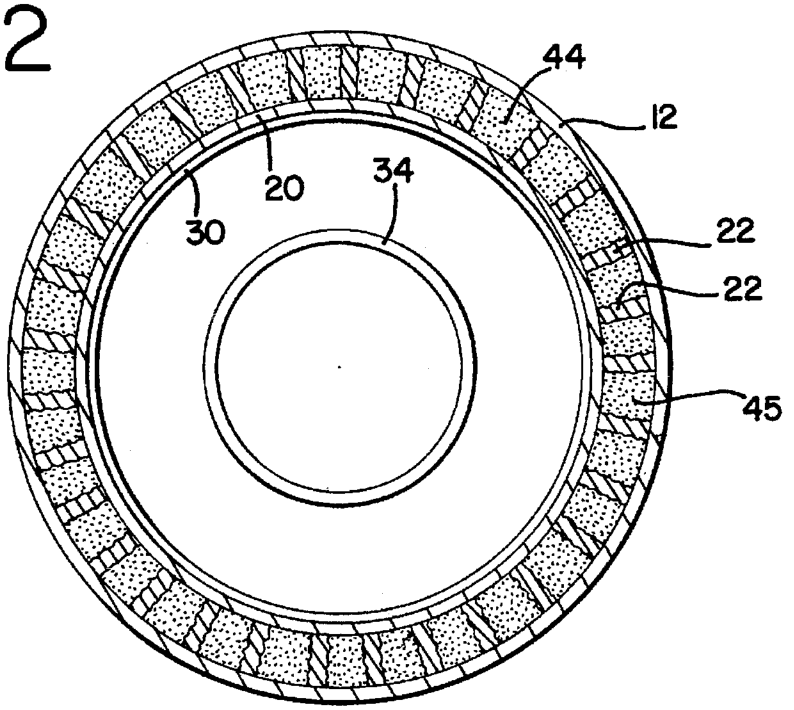
FIG. 12 is a front sectional view, taken along line 12—12 in FIG. 11.

At this point, the form 20 has been fully installed with its outer surface (facing the shell 12) supported by an outer support mechanism and with its inner surface (facing away from the shell 12) supported by an inner support mechanism. The next step is to insert and install a refractory casting composition into the space between the form 20 and the shell 12, until the space is completely filled. Referring to FIGS. 11 and 12, this can be accomplished by continuously injecting a refractory casting material 44 at the locations of the arrows 15 and 17, through the main opening 14 in the vessel 10, between the form 20 and the shell 12.

Because of the relatively limited access for injecting the refractory casting material 44, the selection of a proper casting material is particularly important in order to ensure formation of a uniform refractory lining 45. It is essential that the refractory material 44 be designed to flow smoothly and freely in order to completely fill the space between the form 20 and the shell 12. Preferably, the refractory material 44 is pumpable, and can be transported and injected continuously using a concrete pump or similar pump. One suitable pumpable refractory casting composition is an alumina-based composition disclosed in U.S. Pat. No. 5,147,830, issued to Banerjee and Connors, Jr., the disclosure of which is incorporated herein by reference.

As explained in U.S. Pat. No. 5,147,830, the refractory casting composition can be rendered pumpable and freely flowable by the use therein of an aqueous colloidal silica binder. The aqueous colloidal silica binder includes about 15–70% by weight colloidal silica in water, preferably about 40% by weight. The casting composition may include about 55–90% by weight of a granular refractory base material selected from calcined clay, mullire, brown fused alumina, tabular alumina, and mixtures of these; and about 8–14% by weight of the colloidal silica binder. The composition may also include about 5–20% by weight calcined alumina, and/or about 1–35% by weight silicon carbide.

One particularly suitable casting composition is available under the trade name METPUMP ASP-85 from Magneco/Metrel, Inc. of Addison, Ill. METPUMP ASP-85 resembles the above-described casting composition except that bauxite is employed as the granular refractory ingredient. This preferred casting composition contains about 8–14% by weight of the above-mentioned colloidal silica binder in addition to about 60–70% bauxite, about 15–20% by weight tabular alumina, about 5% or less calcined alumina, and about 2.5% or less silica fume.

After the refractory material 44 has been completely installed, the lining 45 is allowed to harden and set in much the same fashion as the drying of cement. This hardening can be expedited using heat, but should be accomplished at a temperature not greater than about 600° F. (lower if a plastic bag is used as the inner support mechanism). After the lining 45 has set, the inner support mechanism is removed, along with the reusable portions of the form (if any). Then, the lining 45 can be baked.

If one of the refractory materials described above is used to form the lining 45, it is recommended that the lining 45 be dried at room temperature for up to five hours, then baked at a higher temperature (above 250° F.) for 5–30 hours. The drying times may vary depending on the shape and thickness of the refractory lining 45.

While the embodiments of the invention disclosed herein are presently considered to be preferred, various improvements and modifications can be made without departing from the spirit and scope of the invention. The scope of the invention is indicated in the appended claims, and all changes that fall within the meaning and range of equivalence are intended to be embraced therein.

We claim:

1. A method of assembling in situ a mold and installing a refractory lining in a torpedo vessel, comprising the steps of:

providing a torpedo vessel having an inside diameter and a main opening, the main opening having a diameter which is less than the inside diameter of the torpedo vessel;

installing an outer support mechanism inside the torpedo vessel;

installing a form inside the torpedo vessel at a distance from an inner wall of the torpedo vessel, with the outer support mechanism maintaining the distance between the form and the inner wall;

installing a hollow inner support mechanism on a side of the form which faces away from the inner wall;

pumping a refractory composition between the form and the inner wall; and hardening the refractory composition.

2. The method of claim 1 wherein the form comprises a consumable form.

3. The method of claim 2, wherein the consumable form comprises a porous screen.

4. The method of claim 2, wherein the consumable form comprises wood boards.

5. The method of claim 1, wherein the form comprises a non-consumable form.

6. The method of claim 1, wherein the outer support mechanism comprises a plurality of refractory anchors.

7. The method of claim 1, wherein the hollow inner support mechanism comprises a metal frame.

8. The method of claim 1, wherein the hollow inner support mechanism comprises a plurality of rings.

9. The method of claim 1, wherein the hollow inner support mechanism comprises an inflatable bag.

10. The method of claim 1, wherein the refractory casting composition includes a colloidal silica binder.

11. The method of claim 1, further comprising the step of baking the refractory composition.

12. A method of assembling in situ a mold and forming a refractory lining in a metallurgical vessel having an inside diameter and a main opening, the main opening having a diameter which is less than two-thirds of the inside diameter of the vessel, comprising the step of:

providing a metallurgical vessel having an inner wall with a curved cross-section;

installing an outer support mechanism inside the vessel;

installing a form inside the vessel at a distance from the inner wall, with the outer support mechanism maintaining the distance between the form and the inner wall;

installing a hollow inner support mechanism on a side of the form which faces away from the inner wall;

pumping a refractory composition between the form and the inner wall; and hardening the refractory composition.

13. The method of claim 12, wherein the main opening has a diameter which is less than one half of the inside diameter of the vessel.

14. The method of claim 12, wherein the outer support mechanism comprises a plurality of refractory anchors.

15. The method of claim 12, wherein the form comprises a consumable form.

16. The method of claim 15, wherein the consumable form comprises a porous screen.

17. The method of claim 12, wherein the hollow inner support mechanism comprises a metal frame.

18. The method of claim 17, wherein the metal frame comprises a plurality of laterally disposed beams intersecting with a plurality of circumferentially disposed beams.

19. The method of claim 12, wherein the refractory composition is rendered pumpable by the addition of an aqueous colloidal silica binder.

20. The method of claim 19, wherein the refractory composition is comprised primarily of bauxite.

21. A method of assembling in situ a mold and forming a refractory lining in a metallurgical vessel having an inside diameter and a main opening, the main opening having a diameter which is smaller than the inside diameter, comprising the steps of:

providing a metallurgical vessel having an inner wall;

installing an outer support mechanism inside the vessel;

installing a form made using a porous screen inside the vessel at a distance from the inner wall, with the outer support mechanism maintaining the distance between the form and the inner wall;

installing a hollow inner support mechanism on a side of the form which faces away from the inner wall;

pumping a refractory composition comprising bauxite and a colloidal silica binder between the form and the inner wall; and hardening the refractory composition.

22. The method of claim 21, wherein the refractory composition comprises about 60–70% by weight bauxite, up to about 20% by weight tabular alumina, up to about 5% by weight calcined alumina, and about 8–14% by weight of the colloidal silica binder.

23. The method of claim 21, wherein the colloidal silica binder comprises about 15–70% by weight colloidal silica in water.

24. The method of claim 23, wherein the colloidal silica binder comprises about 40% by weight colloidal silica in water.

* * * * *